United States Patent
Meadors et al.

(10) Patent No.: US 12,388,911 B2
(45) Date of Patent: **\*Aug. 12, 2025**

(54) PROXY INJECTION OF BROWSER-EXECUTABLE FUNCTIONS

(71) Applicant: Lightspeed Solutions, LLC, Austin, TX (US)

(72) Inventors: Brock Meadors, Bakersfield, CA (US); Kevin Sanders, Manchaca, TX (US)

(73) Assignee: Lightspeed Solutions, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,583

(22) Filed: Oct. 14, 2020

(65) Prior Publication Data
US 2021/0029220 A1 Jan. 28, 2021

Related U.S. Application Data

(63) Continuation of application No. 15/960,378, filed on Apr. 23, 2018, now Pat. No. 10,855,806.

(51) Int. Cl.
*H04L 67/63* (2022.01)
*H04L 67/50* (2022.01)
*H04L 67/56* (2022.01)

(52) U.S. Cl.
CPC ............. *H04L 67/63* (2022.05); *H04L 67/56* (2022.05); *H04L 67/535* (2022.05)

(58) Field of Classification Search
CPC ........ H04L 67/327; H04L 67/28; H04L 67/22
See application file for complete search history.

(56) References Cited

U.S. PATENT DOCUMENTS

| | | | |
|---|---|---|---|
| 9,420,049 B1 * | 8/2016 | Talmor | H04L 67/22 |
| 10,326,789 B1 * | 6/2019 | Vines | H04L 67/02 |
| 10,855,806 B2 * | 12/2020 | Meadors | G06F 16/9577 |
| 2008/0228910 A1 * | 9/2008 | Petri | H04L 67/28 |
| | | | 709/224 |
| 2010/0153544 A1 * | 6/2010 | Krassner | G06F 16/9577 |
| | | | 709/224 |
| 2014/0215050 A1 * | 7/2014 | Lu | H04L 67/2804 |
| | | | 709/224 |
| 2017/0126627 A1 * | 5/2017 | Yang | H04L 63/20 |

(Continued)

OTHER PUBLICATIONS

Anonymous: "Google Analytics—Wikipedia", Feb. 22, 2018 (Feb. 22, 2018), XP055621150, Retrieved from the Internet: URL: https://en.wikipedia.org/w/index.php?title=Google Analytics&oldid=827025596.

(Continued)

*Primary Examiner* — Glenton B Burgess
*Assistant Examiner* — Jihad K Boustany
(74) *Attorney, Agent, or Firm* — Norton Rose Fulbright US LLP

(57) ABSTRACT

A proxy, such as a proxy server or proxy server application executed on a user device may inject code into web content for execution by a web browser. The injected code may perform functions such as tracking and reporting interaction with the web content and browser-level filtering of the web content. The web browser may execute the injected code to track and report user interaction with the web content and to filter web content delivered to the web browser.

18 Claims, 7 Drawing Sheets

(56) References Cited

U.S. PATENT DOCUMENTS

| | | | | |
|---|---|---|---|---|
| 2017/0228795 | A1* | 8/2017 | Papakostas | G06F 16/951 |
| 2017/0237766 | A1* | 8/2017 | Mattson | G06F 21/60 |
| | | | | 726/23 |
| 2017/0244737 | A1* | 8/2017 | Kuperman | G06N 3/084 |
| 2017/0364949 | A1* | 12/2017 | Vandusen | G06F 16/957 |
| 2018/0012256 | A1* | 1/2018 | Napchi | G06Q 30/0257 |
| 2018/0253415 | A1* | 9/2018 | Halai | G06F 16/95 |
| 2018/0343201 | A1* | 11/2018 | Peterson | H04L 47/125 |
| 2020/0050179 | A1* | 2/2020 | Erickson | G05B 19/4183 |

OTHER PUBLICATIONS

Durieux, T. et al., " Fully Automated HTML and Javascript Rewriting for Constructing a Self-healing Web Proxy", arxiv.org, Cornell University Library, Mar. 23, 2018 (Mar. 23, 2018).

Henkel, Z. "SP Advertisement Injection—CMA Communications" Mar. 29, 2013 (Mar. 29, 2013), XP055597666, Retrieved from the Internet: URL:https://zmhenkel.blogspot.com/2013/03/isp-advertisement-injection-cma.html.

Hruska, F. "Nginx reverse proxy with code injection—FHR's Blog", Sep. 20, 2017 (Sep. 20, 2017), XP055620406, Retrieved from the Internet: URL: https://blog.fhrnet.eu/2017/09/20/nginx-reverse-proxy-with-code-injection/.

Malhotra, P. "Injecting Javascript in HTML Content Using MITM Proxy", Jun. 8, 2015 (Jun. 8, 2015), XP055597689, Retrieved from the Internet: URL:http://pankajmalhotra.com/Injecting-Javascript-In-HTML-Content-Using-MITM-Proxy.

Tsirantonakis et al., "A Large-scale Analysis of Content Modification by Open HTTP Proxies", Proceedings 2018 Network and Distributed System Security Symposium, Feb. 18, 2018 (Feb. 18, 2018), XP055620768, Reston, VA.

Yakushev, R. "Using Outbound Rules to add Web Analytics tracking code: Microsoft Docs", Jul. 16, 2009 (Jul. 16, 2009), XP055621154, Retrieved from the Internet: URL:https://docs.microsoft.com/en-us/iis/extensions/url-rewrite-module/using-outbound-rules-to-add-web-analytics-tracking-code.

* cited by examiner

PROXY INJECTION OF BROWSER-EXECUTABLE FUNCTIONS

CROSS-REFERENCE TO RELATED APPLICATIONS

This patent application is a continuation application of U.S. patent application Ser. No. 15/960,378 to Meadors et al. filed on Apr. 23, 2018 and entitled "Proxy Injection of Browser-Executable Functions," which is hereby incorporated by reference.

FIELD OF THE DISCLOSURE

The instant disclosure relates to web filtering. More specifically, portions of this disclosure relate to injection of browser-executable functions into web content by a proxy.

BACKGROUND

The internet has become a ubiquitous system for users to access content of all kinds. There are generally no checks or bounds of the content on the internet, and most browsing is anonymous. Thus, many organizations have sought to implement systems that can provide some filter on the content users within the organizations can access, as well as some accountability through tracking of the user. One implementation of such a system is a proxy server.

A proxy server may act as an intermediary between a user device and the internet, filtering web content requested from one or more web servers by the user device, allowing approved web content to pass from the web server to the user device and blocking unapproved content from being delivered to the user device. However, a proxy server may be unable to filter or alter web content at the user device. Furthermore, a proxy server may not have access to information regarding a user's interaction with the web content once it is delivered to the user device.

Proxy servers may provide web filtering functions to check a website being requested by a user of a device to determine if the user is permitted to access the requested website. Web filtering may be performed to prohibit access to illegal or inappropriate content based on user age. For example, in a school system, web filtering may be used to prevent student access to websites that do not include appropriate educational content.

The proxy server is a pass-through device. The proxy server receives requests from users, retrieves web pages at the request of a user, and forwards the retrieved web pages to the user. The proxy server may apply web filtering and ignore some requests that are deemed unallowed. However, additional functionality may be desired.

Shortcomings mentioned here are intended to be examples of shortcomings of the described systems and not exhaustive of the systems' deficiencies. Embodiments of the invention described below provide improvements on the conventional systems described above the may address one or more of the shortcomings described above.

SUMMARY

A proxy may inject one or more browser-executable functions into web content that is requested by a web browser of a user device. The functions may enable to the web browser to perform additional functions including enhanced filtering and tracking of web content. For example, injected functions may cause the browser to monitor an amount of time spent by a user viewing the web content, to monitor requests for additional web content, and to filter or alter web content received by the web browser. In another example, the injected functions may cause the web browser to report user interaction data to the proxy, and the proxy may use the data in filtering and reporting subsequently requested content.

In some embodiments, the proxy may be a discrete proxy server separate from the user device, and in other embodiments the proxy may be a proxy server application executed on the user device, acting as an intermediary between one or more web servers and a web browser of the user device. The proxy may receive web content requested by a user device. For example, the proxy may receive web content, from one or more web servers, requested by a user device. The proxy may filter the web content, to determine whether to forward the web content to a user device, based on characteristics of the content, such as a type of the content, a source of the content, or other characteristic of the content. The proxy may inject one or more browser-executable functions into the web content for execution by the web browser of the user device. The browser-executable functions may include one or more code hooks for calling one or more secondary functions stored on the user device, on the proxy, or on a web server. These secondary functions may identify the top-level web request, sanitizing content, computing the time spent viewing the page, and transmit this information to the proxy server for reporting and tracking purposes. The proxy may inject browser-executable functions for filtering web content received by the browser and/or browser-executable functions for tracking content access by a user of the user device, such as browser-executable functions for tracking web browser activity. The browser executable functions may include functions for reporting tracked content access by the user of the user device to the proxy or to a tracking application running on the user device or a tracking server. The injected functions may include JavaScript code, which may be injected into web content. Web content may, for example, include a web page from a HTTP or hypertext transfer protocol secure (HTTPS) server, a file from an FTP server, an image from an HTTP or HTTPS server, JSON data from a web server, or the like.

In some embodiments, the proxy may determine a source of the requested web content and select one or more browser-executable functions to inject into the web content based on the source. For example, the proxy may inject specific browser-executable functions, such as specific content filtering functions, based on a web server from which the web content is received or a web address with which the content is associated. The proxy may inject the selected functions into the web content.

After injecting the one or more functions, the proxy may transmit the web content, containing the one or more functions, to a web browser of the user device. The web browser of the user device may execute the one or more functions in the web content. For example, the web browser may execute a code hook that was injected by the proxy into the web content to call one or more functions stored locally or remotely. The web browser may execute functions to filter content, such as video content, image content, text content, or other content, delivered to the web browser in the web content containing the injected functions. In some embodiments, the web browser may execute functions to filter content delivered at a later time. The web browser may execute functions to track user interaction with web content, such as time spent viewing content and user manipulation of web content. The web browser may execute functions to report user interaction with web content. For example, the web browser may transmit, to a proxy or a local or remote tracking application, information detailing the amount of time spent viewing content, or the type of a request for additional content transmitted from the web browser to a web server. Content requests generated by the web browser may be generated automatically by the web content received by the browser, such as requests for video or advertisement content, or may be top-level requests generated based on user input, such as input of a web address into a navigation bar, selection of a bookmark from a favorites tab, or entering of a term into a search bar. The web browser may report the type of the content request to a proxy, along with the request for content itself. If the proxy blocks the requested content, the proxy may report the blocking of the content if the request for content was generated based on a user request, while, if the request was automatically or otherwise generated, the proxy may refrain from reporting the blocking of the content. If the proxy tracks too many attempts to access blocked content in a defined period of time, the proxy may enter a lockout mode where all web access is denied for a specified window of time. Thus, reports of content access and blocking may be decluttered using one or more injected browser-executable functions.

The proxy may be a discrete proxy server or an application running on a user device. For example, a discrete proxy server and/or a user device may include a processor and/or memory for performing the steps described herein for injecting code. Furthermore, a non-transitory computer readable medium may include code for performing the steps described herein.

Injecting code into web content being delivered to a device allows for more control over what the end user is able to view and how they are allowed to interact with what they are viewing. In some embodiments, the proxy server is capable of injecting code into secure and insecure web pages. Processing of secure web pages is described in U.S. patent application Ser. No. 15/923,557 filed on Mar. 16, 2018 and entitled "User Device-Based Enterprise Web Filtering," which is hereby incorporated by reference. Having the capability to inject code into both clear text and encrypted (secure) transmissions allows the software to operate on many web content types. The code may be used to assists the filtering engine in identifying the top-level web request from the web browser that the user clicked or manually entered for navigation. Logic decisions can then be made using that information to filter and control the user experience with more granularity. Additionally, time spent viewing the page is also able to be calculated within the injected JavaScript and reported back to data collection services.

The injection process is unique when compared to the mechanics of using cookies or how a web server would render server-side scripting such as Hypertext Preprocessor (PHP) or Active Server Pages (ASP) producing an HTML document. Conventionally, a web browser adds special HTTP headers containing cookie data when constructing a web request to a web server requesting cookies before transmitting any data to the web server. Likewise, a web server rendering server-side scripting will modify requested web content internally before anything is transmitted back to the client. A proxy server sits in between these two endpoints and is able to modify the content in the middle as it flows from the web server to the web browser. The proxy server may modify data in either direction, from the web server to the web browser or from the web browser to the web server. Without the code injection the proxy server must make filtering decisions without this additional information, which may lead to undesired or insufficient filtering. For example, without the code rejection the proxy server would see all web content requests and responses but does not have the web browser's understanding or context of why those requests are being made.

The injection process allows distinguish the top-level web request from secondary web requests in order to understand the user intention and prevent the secondary web requests from being reported as intentional. Web browsing reports are more useful when they can highlight the URLs that were explicitly clicked on, opened from a bookmark, or manually typed into the address bar. Auxiliary web requests for assets and ads can be overwhelmingly noisy in reports and is best to be filtered out.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
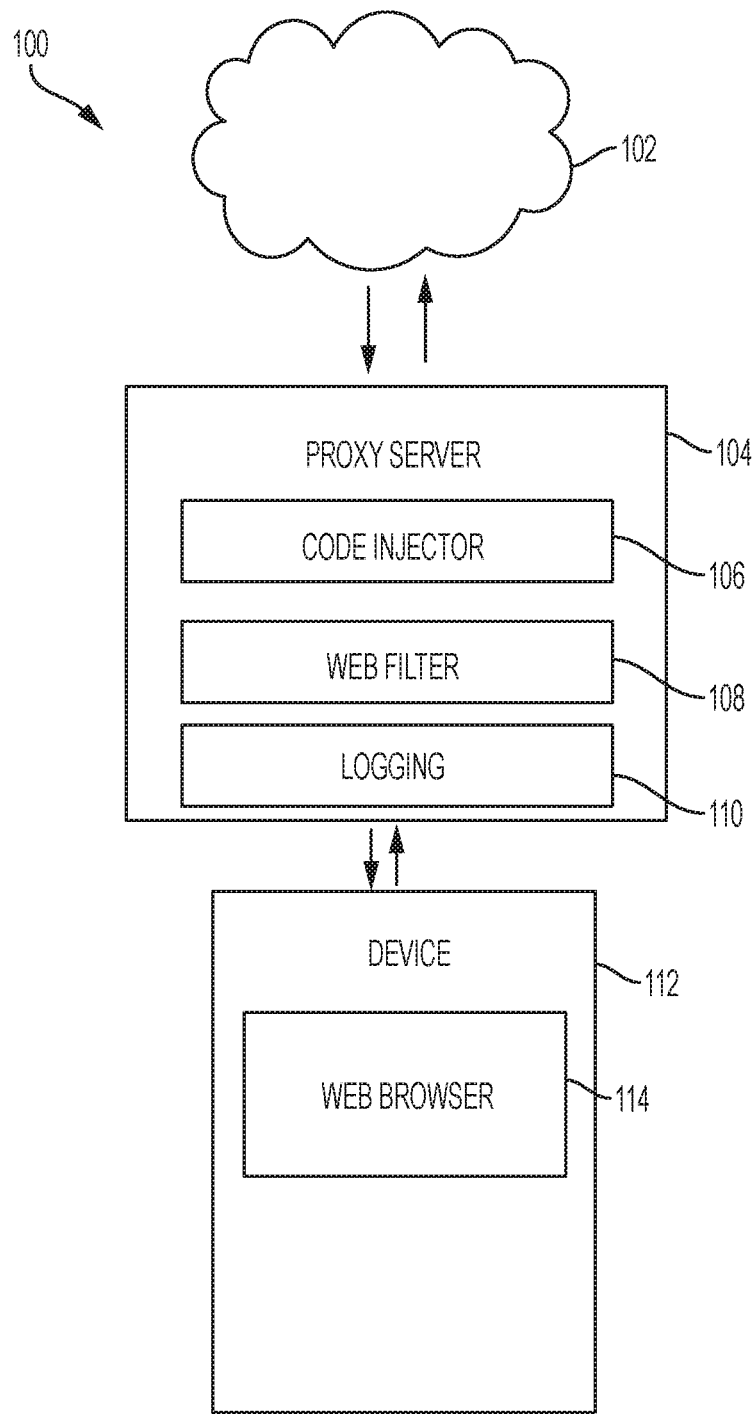
FIG. 1 is a block diagram of a web filtering system with code injection functionality according to some embodiments of the disclosure.

Web content requested by a user device may be filtered and injected with browser-executable functions using a proxy server, as shown in the example configuration of FIG. 1. FIG. 1 is a block diagram of an example web filtering system with code injection functionality according to some embodiments of the disclosure. A proxy server 104 may act as an intermediary between a network 102 and user device 112, filtering web content and injecting the web content with one or more browser executable functions. The proxy server 104 may include a code injector 106 for injecting web content requested by the user device 112 with one or more browser-executable functions. The proxy server 104 may include a web filter 108 for filtering web content received by the proxy server 104. For example, the web filter may compare a source of the received web content with a list of sources, such as a list of network addresses of web servers, to determine if the user device 112 should be allowed to access the received web content. The list may be, for example, a whitelist of permitted network addresses. In another example, the list may be a blacklist of prohibited network addresses. In some embodiments, the proxy server 104 may enter a lockout mode when a number of attempts to access blocked content exceeds a predetermined limit and may prevent the user device 112 from accessing any additional web content for a predetermined period of time. The proxy server 104 may also include a logging engine 110, which may record events, such as network requests made to the proxy server 104, sources of web content, such as network addresses of web server hosts, requested by the user device 112, requested content blocked by the web filter 108, and/or requests for content allowed by the web filter 108. Although a single user device 112 and single proxy server 104 are shown in the example configuration of FIG. 1, any number of proxy servers may act as intermediaries between a network and any number of user devices.

The user device 112 may execute a browser 114 for viewing and interacting with web content. User devices, such as user device 112, may be any type of device including mobile phones, tablets, laptop computers, desktop computers, thin clients, servers, and other Internet-connected devices such as smart televisions and smart Blu-ray players. For example, the web browser 114 may transmit a request for web content to the proxy server 104. The web filter 108 may determine whether or not to transmit the request to a web server of the network 102. Alternatively, the proxy server 104 may automatically transmit the request to the network 102 and the web filter may make the determination of whether the web browser 114 is allowed to access the content after the requested web content is received from the network 102 by the proxy server 104. The logging engine 110 of the proxy server 104 may log the request from the web browser 114 and may log whether or not the browser 114 was allowed by the web filter 108 to access the content.

The code injector 106 may inject various browser-executable functions for use in tracking user interaction with and advanced filtering of web content by the web browser 114. The web content requested by the browser 114 may, for example, be HTTP or HTTPS web content and may already contain JavaScript or other code included in the web content by a web server source of the content. Code may be injected, by the proxy server 104, into both clear text and encrypted transmissions of web content. The code injector 106 may, for example, inject JavaScript code into the web content prior to transmitting the web content to the user device 112. In some embodiments, the code injector 106 may inject a JavaScript hook to instruct the web browser 114 to access and execute other code, such as JavaScript code, stored on the user device 112 or a remote server (NOT SHOWN). The web browser 114 may execute the browser-executable functions injected into the web content when it receives the web content from the proxy server 104. For example, the web browser 114 may execute a JavaScript hook that was injected into the web content to access and execute additional code that is stored on the user device 112 or on a remote server (NOT SHOWN). The browser-executable functions may include functions for tracking access to and interaction with web content by a user of the browser 114. For example, the web browser 114 may track an amount of time spent viewing the web content by a user of the device 112. Additionally, the web browser 114 may track user interaction with web content such as user requests for additional web content. The browser-executable code may cause the web browser 114 to determine a type of request for additional web content, such as whether the request was generated by a user or generated automatically. The web browser 114 may transmit information gathered about user interaction with the web content, such as time spent viewing the web content and the type of subsequent requests for web content, to the proxy server 104 or to an alternative tracking server (NOT SHOWN). The logging engine 110 of the proxy server 104 may log the information received from the web browser 114, and, in some embodiments, may generate a report detailing logged information or may transmit the logged information to an additional server for report generation.

Figure 2:
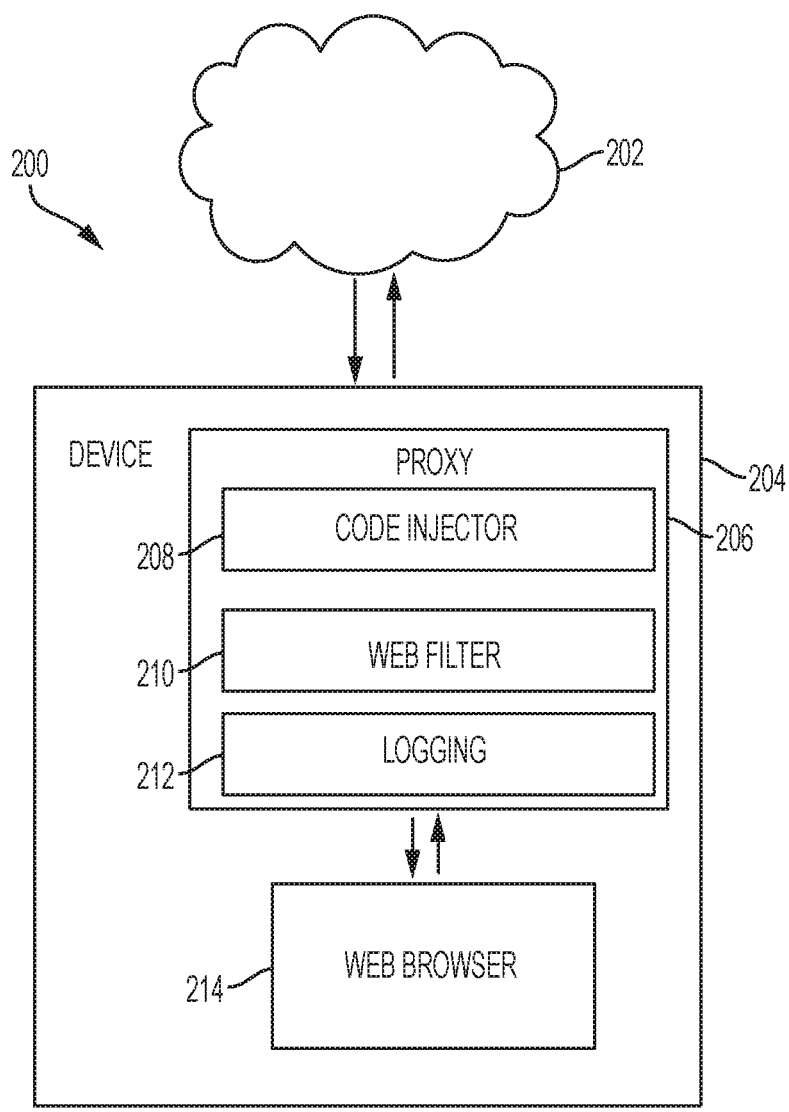
FIG. 2 is a block diagram of a web filtering system using user device-level proxies with code injection functionality according to some embodiments of the disclosure.

Some user devices may execute a proxy server application that acts as an intermediary between a network and a browser of the user device, as shown in FIG. 2. The user device 204 may execute a proxy server application 206 that may function much the same as the proxy server 104, illustrated in FIG. 1, except, instead of being a discrete server, the proxy 206 may be an application executed on the user device 204. Similar to the proxy server 104 of FIG. 1, the proxy 206 may include a code injector 208, a web filter 210, and a logging engine 212. The web filter 210 of the proxy 206 may filter content requested from the network 202 by the web browser 214, as described with respect to the web filter 108 of FIG. 1. The code injector 208 may inject one or more browser-executable functions into the web content, as described with respect to the code injector 106 of FIG. 1. The logging engine 212 may log and report activity of the proxy 206 and activity information received from the web browser 214, as described with respect to the logging engine 110 of FIG. 1.

Figure 3:
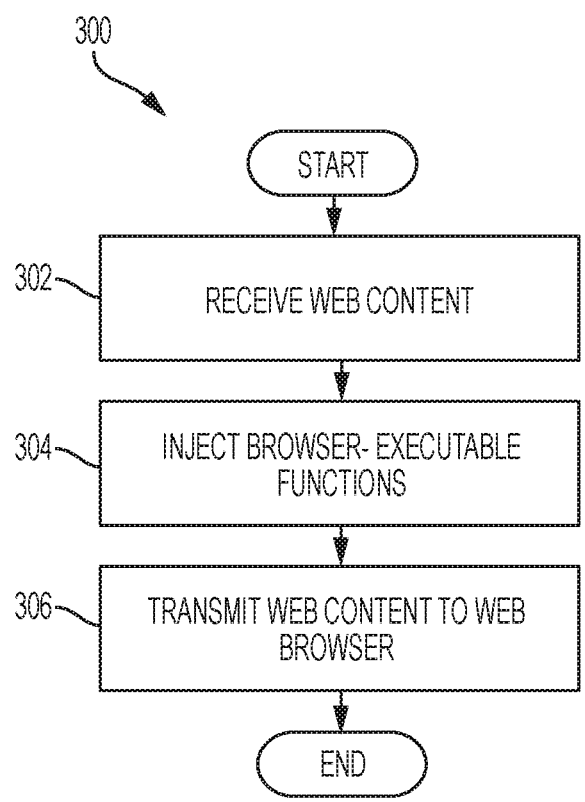
FIG. 3 is a flow chart illustrating an example method of injecting browser-executable functions into requested web content according to some embodiments of the disclosure.

A method 300 of injecting browser-executable functions into requested web content is shown in FIG. 3. The method 300 may begin with receipt of web content at step 302. For example, a proxy server or proxy server application executed on a user device may receive web content, such as text, video, audio, or other web content, from a web server that was requested by a user device. At step 304 one or more browser-executable functions may be injected into the web content. For example, the proxy server or proxy application may add JavaScript code, or other code, to the requested web content including one or more browser-executable functions. The JavaScript code may include one or more JavaScript hooks for directing the browser to execute JavaScript code or other code stored on a user device or remote server. When injecting the code, the web content data may be buffered and parsed into a proper hierarchical structure to ensure any modifications are correctly done. Once the browser-executable functions have been injected, the web content, including the browser-executable functions, may be transmitted, at step 306, to a web browser of a user device.

Figure 4:
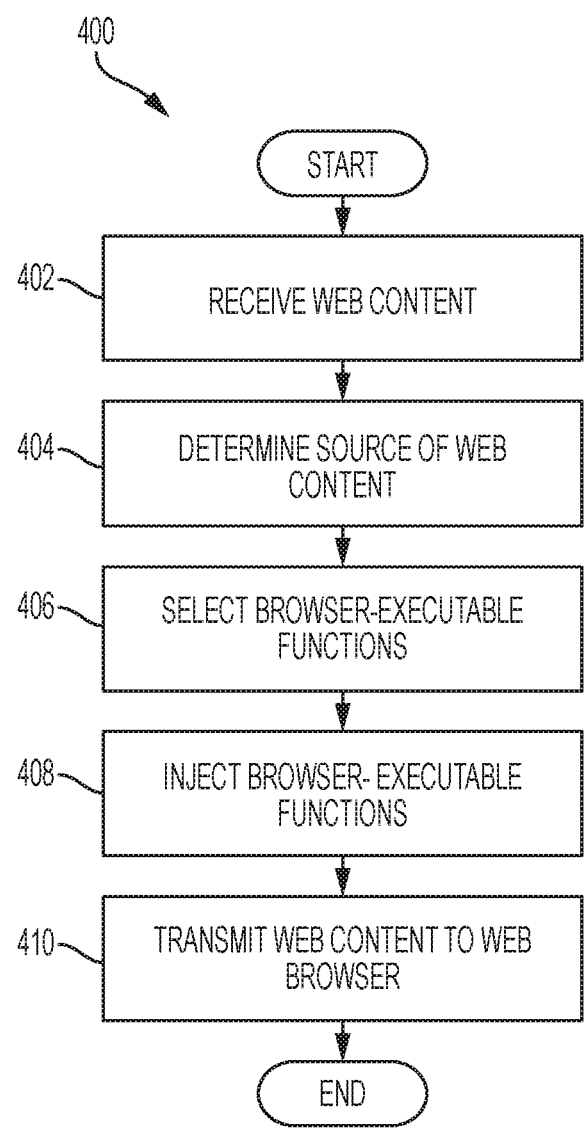
FIG. 4 is a flow chart illustrating an example method of selecting and injecting browser-executable functions into requested web content based on a source of the web content according to some embodiments of the disclosure.

In some embodiments, browser-executable functions may be selectively injected into web content based on a source of the web content. An example method 400 of selectively injecting browser-executable functions into requested web content is shown in FIG. 4. The method 400 may begin with receipt of web content at step 402. At step 404, the web content may be examined to determine a source of the web content. For example, a network address of a web server from which the content originated may be determined. At step 406, one or more browser-executable functions may be selected based, at least in part, on the determined source of the web content. For example, certain filtering functions, such as functions for sanitizing video, image, audio, or other web content, to be performed by a web browser may be selected by a proxy server or a proxy application executed on a user device based on the source of the web content. The selected browser-executable functions may then be injected, at step 408, into the received web content. At step 410, the web content, along with the injected browser-executable functions, may be transmitted to a web browser.

Figure 5:
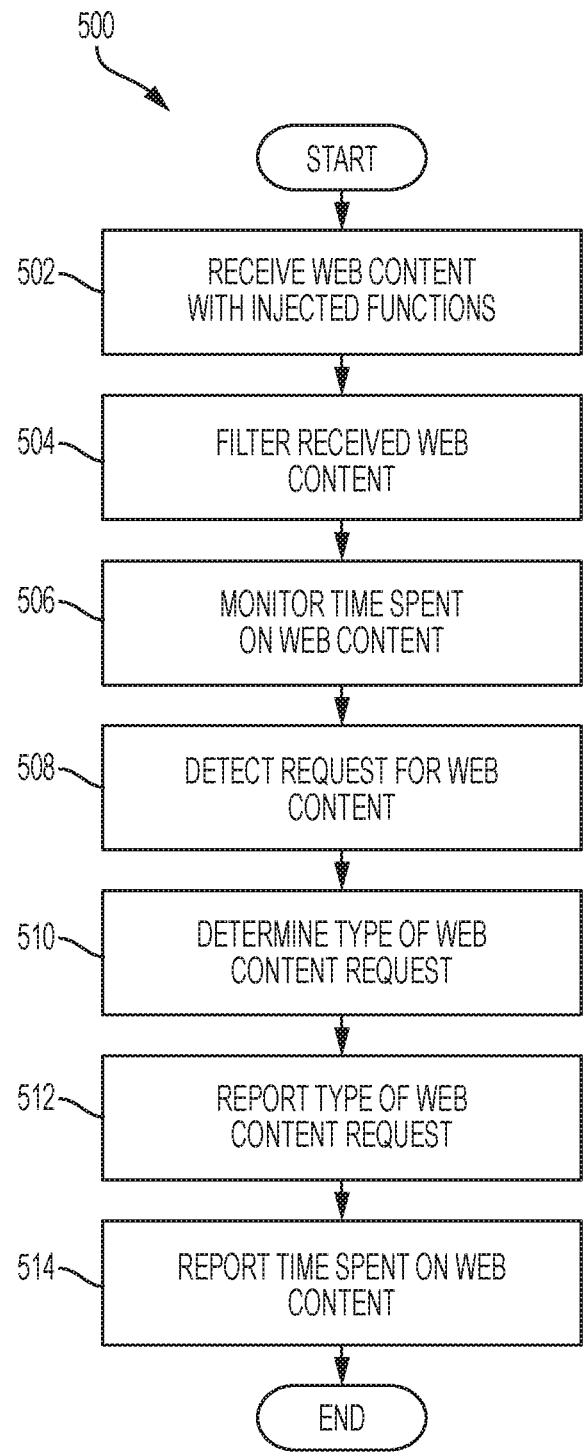
FIG. 5 is a flow chart illustrating an example method of executing browser-executable functions received in requested web content according to some embodiments of the disclosure.

A web browser of a user device may execute injected browser-executable functions when it receives web content containing the browser executable functions. An example method 500 of executing browser-executable functions injected into received web content is shown in FIG. 5. The method 500 may begin, at step 502, with receipt of web content containing one or more injected browser-executable functions. For example, a web browser of a user device may receive web content from an external proxy server or from a proxy server application executed on the user device.

The web browser may execute the browser executable functions contained in the received web content. The browser-executable functions contained in the web content may include functions for filtering, usage monitoring, and reporting. In some embodiments, the browser-executable functions contained in the web content may include code hooks for accessing functions for execution by the browser stored on a user device or on a remote server. At step 504, the browser may execute functions for filtering the received web content. For example, the browser-executable functions injected into the web content may include functions for sanitizing video, image, or text content of a website. In some embodiments, the filtering functions may filter content subsequently requested by the web browser after the web content containing the browser executable functions is received. The web content containing the browser executable functions may include a web page for streaming video or audio content. The browser may execute filtering functions to filter the streaming video or audio content as it is streamed to the web browser.

At step 506, the browser may execute functions for monitoring time spent interacting with the web content. For example, the browser may track time spent viewing video content, listening to audio content, or viewing web content on the web page. At step 508, the browser may also detect a request for additional web content. At step 510, the browser may determine a type of the web content request. For example, a web request may be a top level web request generated by user action such as selection of an option on a website to navigate to, entering of a web address into the web browser, selection of a bookmark from a list of bookmarks, or any other user generated instruction to access web content. Alternatively, the web request may be an auxiliary web request automatically generated by the browser, such as an advertisement refresh, a request for additional assets, an embedded request, such as a JavaScript request, for additional web content, or another request automatically generated by the web browser. At step 512, the web browser may report the type of the web browser request. For example, the web browser may report the type of the web browser request, along with transmitting the request itself, to a proxy such as a proxy server or proxy server application. Alternatively or additionally, the web browser may report the type of the web browser request to a separate tracking server or application. At step 514, the web browser may also report the time spent interacting with the web content. For example, the web browser may report viewing time to a proxy, such as a proxy server or a proxy server application on the user device, or to a separate tracking application or server.

Figure 6:
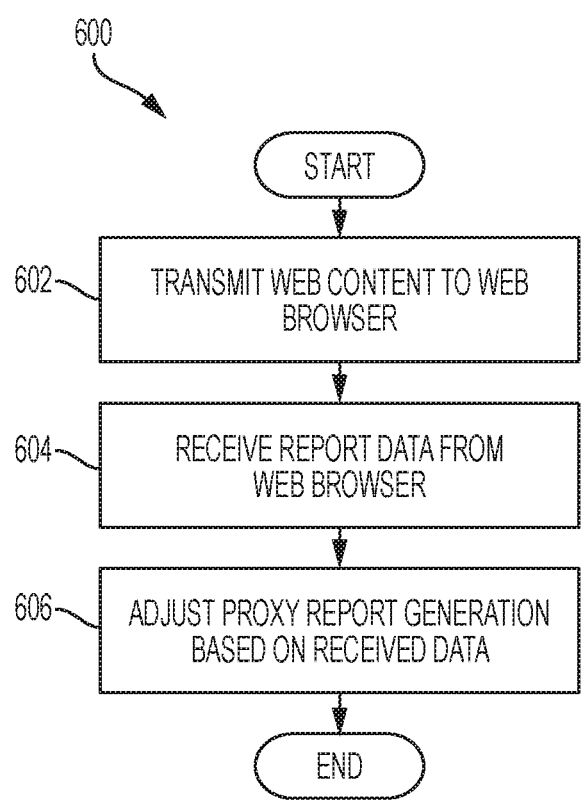
FIG. 6 is a flow chart illustrating an example method of adjusting proxy report generation based on report data received from a web browser according to some embodiments of the disclosure.

A method 600 of adjusting proxy report generation based on report data received from a web browser is shown in FIG. 6. The method 600 may begin, at step 602, with transmitting web content to a web browser. For example, a proxy may inject one or more browser-executable tracking functions into the web content and transmit the web content to a web browser of a user device. At step 604, report data may be received from the web browser. The report data may include a type of a web content request, a time spent interacting with the web content, and other information regarding the use of the web browser, as described with respect to FIG. 5. At step 606, proxy report generation may be adjusted based on the received data. For example, the proxy server may include filtering functionality, as described above, and may generate reports detailing content blocked and/or allowed by the proxy. Using the type of the content request transmitted by the browser, the proxy server may limit extraneous information included in the generated reports by reporting blocked content that was requested with a top level, user-generated request and refraining from reporting blocked content that was requested with another type of request. Alternatively, the proxy server may include all blocked web content in reports but may highlight blocked web content that was requested with a top-level user-generated request. The proxy or tracking application or server may also include time spent viewing and/or interacting with web content in reports. The proxy server or proxy server application may report blocked requests and time spent viewing the web pages to cloud infrastructure associated with the proxy. In some embodiments, the generated report may include a time of a request for web content, a type of the request for web content, a web address of the web content requested, a reason why the requested content was allowed or blocked, a device IP address of a user device that requested the web content, and/or a user name of the account on the user device that requested the web content.

Figure 7:
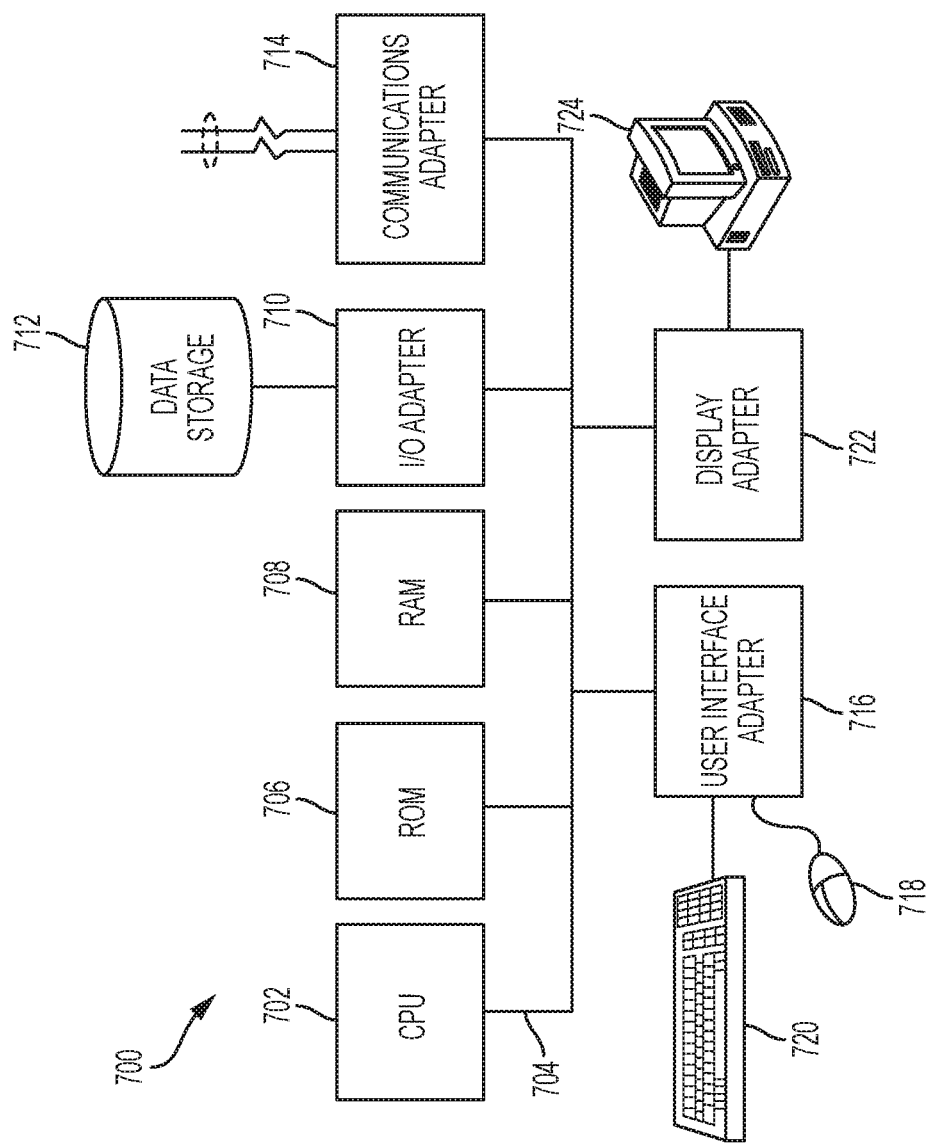
FIG. 7 is a schematic block diagram illustrating one embodiment of a user device that may be used in accordance with certain embodiments of the system.

FIG. 7 is a schematic block diagram illustrating one embodiment of a user device that may be used in accordance with certain embodiments of the system. A computer system 700 illustrates a computer system according to certain embodiments of the user device. The central processing unit (CPU) 702 is coupled to the system bus 704. The CPU 702 may be a general-purpose CPU or microprocessor. The present embodiments are not restricted by the architecture of the CPU 702, so long as the CPU 702 supports the modules, applications, and operations as described herein. The CPU 702 may execute various logical instructions according to disclosed embodiments.

The computer system 700 may include Random Access Memory (RAM) 708, which may be SRAM, DRAM, SDRAM, or the like. The computer system 700 may use RAM 708 to store the various data structures used by a software application. The computer system 700 may also include Read Only Memory (ROM) 706 which may be PROM, EPROM, EEPROM, optical storage, or the like. The ROM 706 may store configuration information for booting the computer system 700. The RAM 708 and the ROM 706 hold user and system data.

The computer system 700 may also include an input/output (I/O) adapter 710, a communications adapter 714, a user interface adapter 716, and a display adapter 722. The I/O adapter 710 and/or user the interface adapter 716 may, in certain embodiments, enable a user to interact with the computer system 700 in order to input information, such as to make network requests for network resources. In a further embodiment, the display adapter 722 may display a graphical user interface associated with software for generating the network requests, such as a web browser.

The I/O adapter 710 may connect to one or more data storage devices 712, such as one or more of a hard drive, a Compact Disk (CD) drive, a floppy disk drive, a tape drive, to the computer system 700. The communications adapter 714 may be adapted to couple the computer system 700 to a network, which may be one or more of a wireless link, a LAN and/or WAN, and/or the Internet. The user interface adapter 716 couples user input devices, such as a keyboard 720 and a pointing device 718 or a touchscreen, to the computer system 700. The display adapter 722 may be driven by the CPU 702 to control the display on the display device 724.

Disclosed embodiments are not limited to the architecture of system 700. Rather, the computer system 700 is provided as an example of one type of computing device that may be adapted to perform functions of a user device. For example, any suitable processor-based device may be utilized including, without limitation, personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the disclosed embodiments.

The schematic flow chart diagrams of FIG. 3, FIG. 4, FIG. 5, and FIG. 6 are generally set forth as logical flow chart diagrams. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

In view of the disclosure above, one of ordinary skill in programming is able to write computer code or identify appropriate hardware and/or circuits to implement the disclosed invention without difficulty based on the flow charts and associated description in this specification. Therefore, disclosure of a particular set of program code instructions or detailed hardware devices is not considered necessary for an adequate understanding of how to make and use the invention. The inventive functionality of the claimed computer-implemented processes is explained in more detail in the above description and in conjunction with the figures.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    receiving, by a proxy, web content for a web browser on a user device, wherein the web content comprises web components configured to make auxiliary web requests;
    injecting, by the proxy, one or more browser-executable functions into the web content, wherein the one or more browser-executable functions comprise executable code, wherein the executable code is executed by the web browser on the user device and collects user interaction metrics indicating parameters of one or more user interactions with the web content;

transmitting, by the proxy, the web content, comprising the injected browser-executable functions, to the web browser of the user device;
receiving, by the proxy, a content request and an indication, the indication provided by the executable code of the injected one or more browser-executable functions, wherein the indication indicates whether the one or more user interactions with the web content is an auxiliary web request for a video asset and generated by a component of the web content or the content request is a user-generated request;
filtering, by the proxy, the content request based on the indication and whether the content request is for a video asset;
allowing, by the proxy, the web content when the indication indicates that the content request is generated by at least one user-generated request;
blocking, by the proxy, the web content when the indication indicates that the content request is generated by the web content; and
reporting, by the proxy, the allowed web content.

2. The method of claim 1, wherein the injection of the one or more browser-executable functions is performed by the user device executing the web browser.

3. The method of claim 1, further comprising:
determining a source of the web content; and
selecting one or more browser-executable functions based, at least in part, on the source of the web content, wherein the step of injecting comprises injecting, by the proxy, the selected one or more browser-executable functions into the web content.

4. The method of claim 1, wherein the one or more browser-executable functions comprise code for use by the web browser in performing browser-level filtering of the web content.

5. The method of claim 1, wherein the one or more browser-executable functions comprise code for use by the web browser in sanitizing at least one of video, image, or audio content.

6. The method of claim 1, further comprising filtering, by the proxy, all content requests from the user device for a first period of time when a number of filtered content requests within a second period of time exceeds a threshold number.

7. The method of claim 1, wherein the injected one or more browser-executable functions further comprise code for determining an amount of time spent viewing the web content by the user.

8. A computer program product, comprising:
a non-transitory computer readable medium comprising code to perform steps comprising:
receiving web content for a web browser, wherein the web content comprises web components configured to make auxiliary web requests;
injecting one or more browser-executable functions into the web content, wherein the one or more browser-executable functions comprise executable code, wherein the executable code is executed by the web browser on a user device and collects user interaction metrics indicating parameters of one or more user interactions with the web content;
transmitting the web content, comprising the injected one or more browser-executable functions, to the web browser;
receiving a content request and an indication, the indication provided by the executable code of the injected one or more browser-executable functions, wherein the indication indicates whether the one or more user interactions with the web content is an auxiliary web request for a video asset and generated by a component of the web content or the content request is a user-generated request;
filtering the content request based on the indication and whether the content request is for a video asset;
allowing, by the proxy, the web content when the indication indicates that the content request is generated by at least one user-generated request;
blocking, by the proxy, web content when the indication indicates that the content request is generated by the web content; and
reporting, by the proxy, the allowed web content.

9. The computer program product of claim 8, wherein the one or more browser-executable functions comprise code for use by the browser in performing browser-level filtering of the web content.

10. The computer program product of claim 8, wherein the one or more browser-executable functions further comprise code for use by the web browser in reporting tracked content access.

11. The computer program product of claim 8, wherein the one or more browser-executable functions comprise code for use by the web browser in sanitizing at least one of video, image, or audio content.

12. The computer program product of claim 8, wherein the one or more browser-executable functions comprise code for determining an amount of time spent viewing the web content.

13. An apparatus, comprising:
a memory; and
a processor coupled to the memory, wherein the processor is configured by code in the memory to perform steps comprising:
receiving web content, wherein the web content comprises web components configured to make auxiliary web requests;
injecting one or more browser-executable functions into the web content, wherein the one or more browser-executable functions comprise executable code, wherein the executable code is executed by the web browser on a user device and collects user interaction metrics indicating parameters of one or more user interactions with the web content;
transmitting the web content, comprising the injected one or more browser-executable functions, to the web browser;
receiving a content request and an indication, the indication provided by the injected one or more browser-executable functions, wherein the indication indicates whether the one or more user interactions with the web content is an auxiliary web request for a video asset and generated by a component of the web content or the content request is a user-generated request;
allowing, by the proxy, the content request when the indication indicates that the content request is generated by at least one user-generated request;
blocking, by the proxy, web content when the indication indicates that the content request is generated by the web content; and
reporting, by the proxy, the allowed web content.

14. The apparatus of claim 13, wherein the one or more browser-executable functions comprise code for use by the browser in performing browser-level filtering of the web content.

15. The apparatus of claim 13, wherein the processor is further configured to execute the web browser.

16. The apparatus of claim 13, wherein the one or more browser-executable functions further comprise code for use by the web browser in reporting tracked content access to a proxy.

17. The apparatus of claim 13, wherein the one or more browser-executable functions further comprise code for determining an amount of time spent viewing the requested web content by the user.

18. The apparatus of claim 13, wherein the one or more browser-executable functions comprise code for use by the web browser in sanitizing at least one of video, image, or audio content.

\* \* \* \* \*